United States Patent [19]
Srivastava et al.

[11] Patent Number: 6,049,416
[45] Date of Patent: Apr. 11, 2000

[54] ERBIUM-DOPED FIBER AMPLIFIERS WITH DESIRED GAIN-BANDWIDTH CHARACTERISTICS

[75] Inventors: Atul Kumar Srivastava, Eatontown; James W. Sulhoff, Ocean; Yan Sun, Middletown; John Lehrer Zyskind, Shrewsbury, all of N.J.

[73] Assignee: Lucent Technologies Inc., Murray Hill, N.J.

[21] Appl. No.: 09/016,479

[22] Filed: Jan. 30, 1998

Related U.S. Application Data

[60] Provisional application No. 60/038,193, Feb. 14, 1997.

[51] Int. Cl.[7] .............................. H01S 3/00; G01N 21/17
[52] U.S. Cl. .......................... 359/341; 356/72; 356/73.1
[58] Field of Search ........................ 359/341; 356/73.1, 356/72

[56] References Cited

U.S. PATENT DOCUMENTS

| | | | |
|---|---|---|---|
| 5,677,781 | 10/1997 | Mori et al. | 359/179 |
| 5,706,125 | 1/1998 | Nakano | 359/341 |
| 5,825,530 | 10/1998 | Leckel et al. | 359/333 |
| 5,917,649 | 6/1999 | Mori et al. | 359/341 |

OTHER PUBLICATIONS

Zeiler et al, "Modeling of Four–wave Mixing and gain peaking in amplified WDM optical communication systems and Networks" Journal of Lightwave technology, pp. 1 and 2, 1996.

*Primary Examiner*—Mark Hellner
*Attorney, Agent, or Firm*—J. J. Brosemer

[57] ABSTRACT

A method for determining the optimal design of a gain equalization filter (GEF) used in optical fiber amplifiers. The method is suitable for erbium-doped fiber amplifiers (EDFA) that are widely used in wavelength-division-multiplexed (WDM) optical communication systems and networks.

17 Claims, 3 Drawing Sheets

ERBIUM-DOPED FIBER AMPLIFIERS WITH DESIRED GAIN-BANDWIDTH CHARACTERISTICS

CROSS REFERENCE TO RELATED APPLICATION

This application claims the benefit of U.S. Provisional Application No. 60/038193 filed Feb. 14, 1997.

TECHNICAL FIELD

This invention relates generally to the field of fiber amplifiers in particular to erbium-doped fiber amplifiers having desirable gain-bandwidth characteristics.

BACKGROUND OF THE INVENTION

There has been considerable interest in using rare earth doped fiber amplifiers to amplify optical signals used in communications networks. The rare earth doped fiber amplifiers are found to have low cost, exhibit low-noise, provide relatively large bandwidth which is not polarization dependent, display substantially reduced crosstalk, and present low insertion losses at relevant operating wavelengths. As a result of their favorable characteristics, rare earth doped fiber amplifiers, i.e., erbium-doped fiber amplifiers (EDFA's) are replacing current optoelectronic regenerators in many optical lightwave communications systems, and particularly, wavelength-division-mulltiplexed (WDM) optical communications systems.

A known characteristic of EDFA's is that the gain of an EDFA is not flat over a wide range WDM bandwidth. As such, the number of channels in fiber communications systems employing EDFA's is limited. The prior art has solved this problem by adding gain equalization filters (GEF's) in the EDFA's. Unfortunately however, the correct design of a particular GEF is often difficult to produce analytically or numerically. In particular, numerical simulation methods are oftentimes inaccurate, resulting in part from errors in EDF parameters, component loss estimation, and spectral hole burning. Consequently, a continuing need exists for methods and apparatus that facilitate the design of GEF's used in fiber communications systems.

SUMMARY OF THE INVENTION

The above problems are overcome and advance is made over the prior art in accordance with the principles of the present invention directed to a method for the design of gain equalization filters (GEF's) for use in fiber communications systems. Advantageously, the method and apparatus work with many technologies, for example, long period fiber gratings, silicon optical bench waveguide technologies and dielectric film layers.

Viewed from one aspect, the present invention is directed to a method for determining the optimal design of a GEF wherein the GEF is positioned at an output end of a fiber amplifier. The method involves applying a signal having a known, designed power spectrum to an input of the amplifier, measuring an output power spectrum for a signal output from the amplifier, and determining a characteristic shape of the GEF from a difference between a desired spectrum and the measured output power spectrum.

Viewed from another aspect, the present invention is directed to a method for determining the optimal design of a GEF wherein the GEF is positioned at an input end of the fiber amplifier. Finally, viewed from yet another aspect, the invention is directed to a method for determining the optimal design of a GEF wherein the GEF is positioned in an optical path between multiple stages of a fiber amplifier.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

For simple EDFA's having a single gain stage, there are two possible locations for GEF placement, i.e., front or end. For EDFA's with two or more stages, three possible locations exist for GEF placement, front, middle, and end. As is known in the art, middle refers to a point between two adjacent stages.

Figure 1:
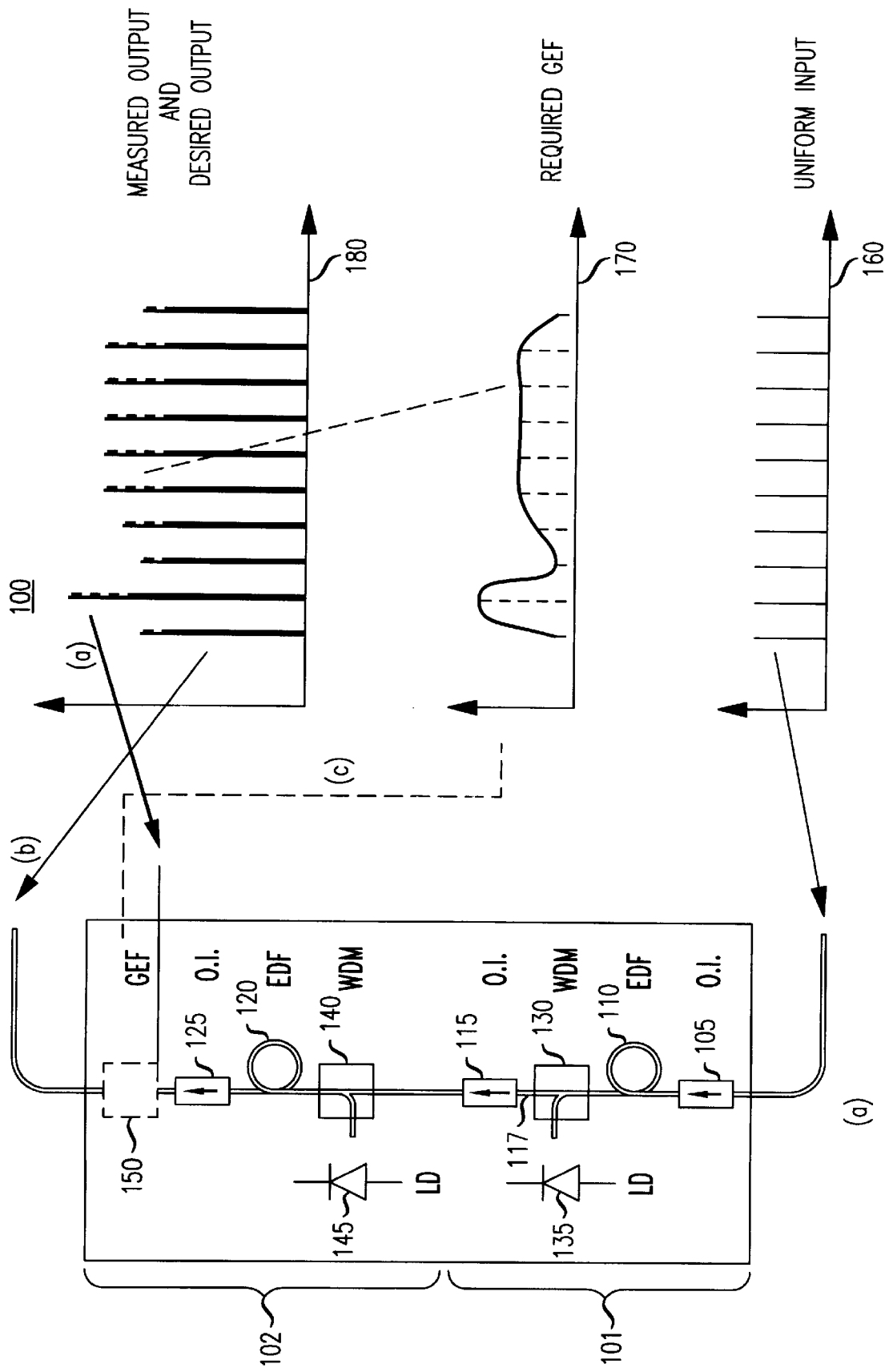
FIG. 1 shows in simplified block diagram form, GEF design according to the principles of the present invention wherein the GEF is situated at an end portion of an EDFA.

With reference to FIG. 1, there it shows in simplified block diagram form, an arrangement suitable for the effective design of a GEF in accordance with the principles of the invention. Those skilled in the art will quickly recognize that such an arrangement of elements forms a two-stage optical amplifier 100. Specifically, the optical amplifier 100, has two stages, a first stage 101 and a second stage 102, each comprising an erbium-doped fiber (EDF) 110 and 120 respectively. In the first stage 101, wavelength division multiplexer 130, permits the introduction of light from a pump source, i.e., laser diode 135, to counter-propagate with respect to an input of the first stage 101. Optical isolator 105, is positioned at the input of the first stage 101 to suppress reflections and pump light source oscillations. Erbium doped fibers, WDM's and optical isolators and the functions employed therein are well known in the art.

Pump light may be generated by laser diode 135 at one of any number of wavelengths, i.e., 980 nm and 1480 nm. It will be readily appreciated by those skilled in the art that it may be desirable to use a separate laser diode 145 to generate pump light in the second stage 102. While not explicitly shown in FIG. 1, a single laser diode may be coupled into a splitter (not shown) to distribute pump light between the first stage 101 and the second stage 102 of the optical amplifier. Alternatively, both laser diodes 135 and 145 could be coupled into the splitter for enhanced reliability as pump light would still be introduced into both stages even if one laser diode failed. Splitting devices, EDF's, WDM's and optical isolators, are well known and those skilled in the art will readily recognize that a variety of such devices may be employed as appropriate.

The first stage 101 and second stage 102 are coupled together by fiber 117 so that an amplified signal output from the first stage 101 is presented to an input of the second stage 102. Optical isolator 115 may be positioned in the fiber 117 so that any backward-propagating emissions from the second stage 102 do not reach the first stage 101. As those skilled in the art will readily appreciate, the exact definition of a stage, and where a first stage ends and a second stage begins is difficult to define. Generally, however, a particular stage is associated with a particular EDF.

Similar to the first stage 101, second stage 102 comprises WDM 140, to couple pump light from laser diode 145 into erbium-doped fiber 120 which co-propagates with the signal output from the first stage 101 to advantageously allow additional signal gain without a significant amount of additional noise. As will be readily appreciated by those skilled in the art, the length of erbium-doped fibers used in both stages may be appropriately chosen so that substantial gain and output power may be realized while still maintaining a low noise figure.

As noted previously, gain equalization filters (GEF's) may be advantageously used in fiber amplifiers such as the one shown in FIG. 1. Specifically, and as shown in FIG. 1., GEF 150 is positioned at an output end of the second stage 102. In designing GEF 150 for such an amplifier, the following steps are followed:

1) Apply a designed input signal 160 having a known power spectrum to the input of the first stage 101 of the optical amplifier 100;

2) Measure an output power spectrum (a) for the signal output of the second stage 102, of the optical amplifier 100; and 3) Calculate a difference between the measured output power spectrum
   (a) and a desired output power spectrum
   (b), wherein the calculated difference
   (c) defines the characteristic shape of the GEF 150.

As depicted in FIG. 1., the input signal 160 may advantageously have a uniform power spectrum in certain situations, as desired.

Figure 2:
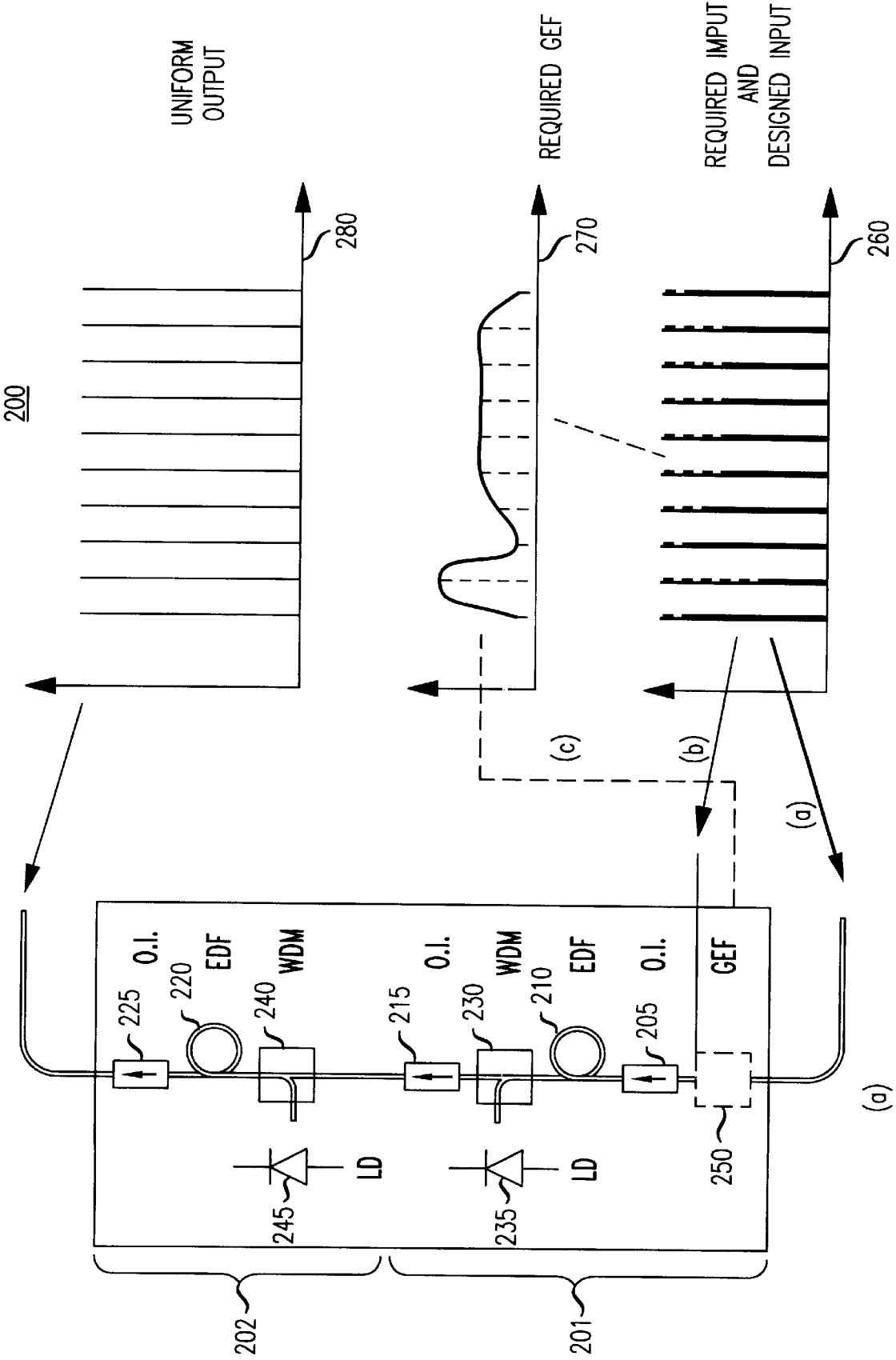
FIG. 2 shows in simplified block diagram form, GEF design according to the principles of the present invention wherein the GEF is situated in a front portion of the EDFA.

FIG. 2 shows a second arrangement of elements in accordance with the principles of the invention. This second arrangement is similar to the first arrangement depicted in FIG. 1, with the exception that GEF 250 has been moved to the input of first stage 201. An optimal design of GEF 250 is determined by performing the following steps:

1) Measure an input spectrum 260(a) of a signal;

2) Determine a required input signal 260 (b) having a suitable input power spectrum such that a desirable output power spectrum of the output signal (280) is produced; and 3) Calculate a difference between the input signal power spectrum (a) and the required input power spectrum (b) wherein the calculated difference (c) defines the characteristic shape of the GEF 250.

For EDFA's having two or more stages, a middle location of the GEF is possible. Oftentimes, and as will be appreciated by those skilled in the art, the best location to place a GEF in an EDFA is in a middle location. Such middle placement often results in favorable noise and output power characteristics of the EDFA.

Clearly, GEF's placed in a middle location may be quite different from those placed in a front or end location as depicted in the first and second arrangements previously described. One simple method to design such a middle GEF would be to use an initial GEF that is optimal for a front or end location. This initial GEF is then placed in a middle location and subsequently measured and iteratively optimized to produce a suitable design. As should be readily apparent, such an iterative method is both time consuming and costly.

Figure 3:
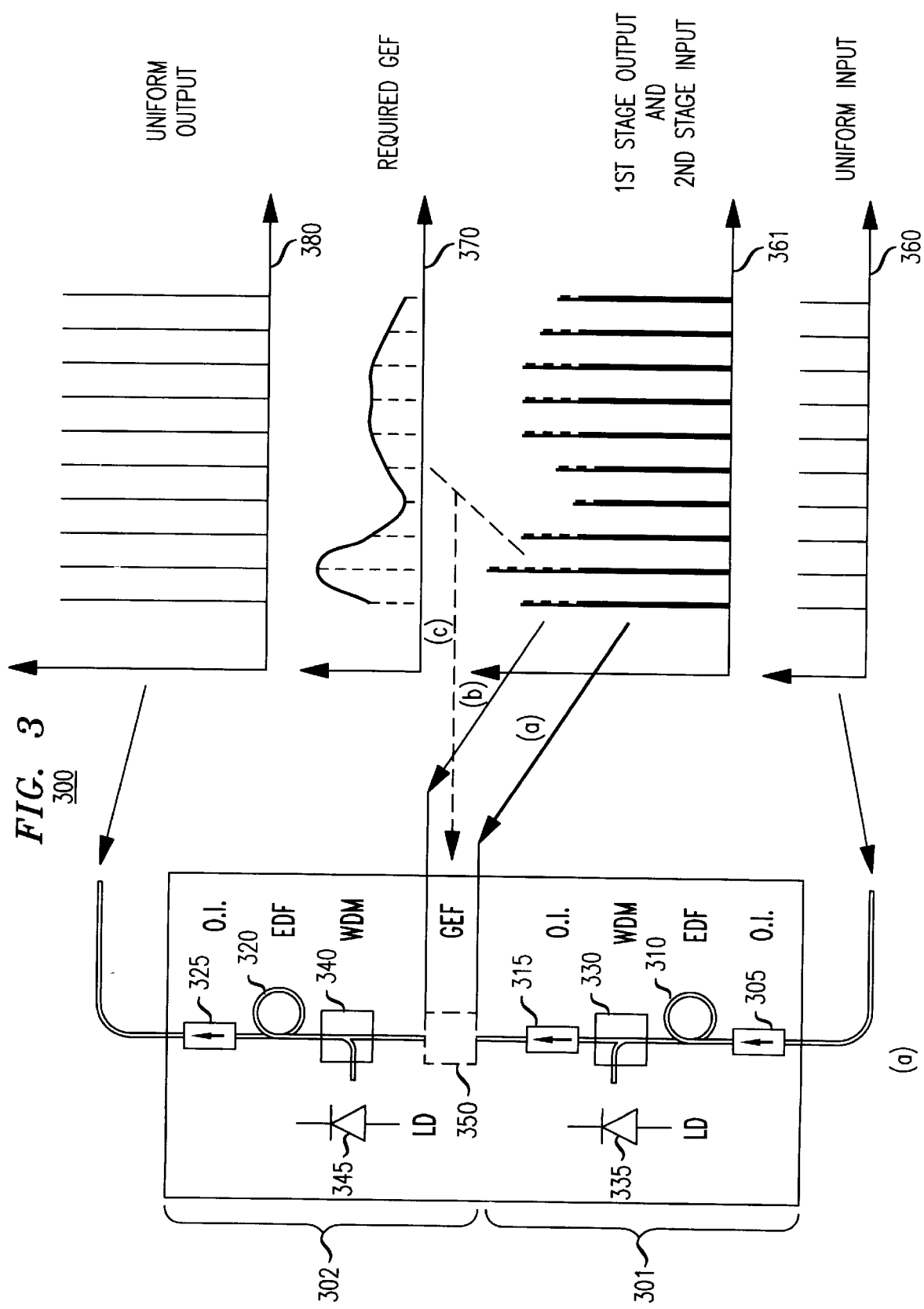
FIG. 3 shows in simplified block diagram form, GEF design according to the principles of the present invention wherein the GEF is situated in a middle portion of the EDFA.

FIG. 3. shows such an exemplary EDFA having a GEF 350 positioned in a middle location, between the first stage 301 and the second stage 302. For the purpose of this example, both the designed input signal 360 and the desired output signal 380 have uniform power spectrum. To design a GEF for such middle placement, the following steps are performed:

1) Apply an input signal having a characteristic power spectrum 360 to an input stage 301 of the EDFA;

2) Measure an output power spectrum (a) at an output of this first stage before an input to a second stage 302;

3) Determine an input power spectrum (b) of the second stage 302 which produces an output signal of this second stage having a desirable power spectrum 380; and 4) Calculate a difference (c) between the input power spectrum (b) of the second stage and the output power spectrum of the first stage ( )a wherein the calculated difference (c) defines the characteristic shape of the GEF 350, i.e., 370.

For amplifiers with more than two stages, the design can be done similarly. In such a case, the first stage 301 of FIG. 3 represents all of the stages before the GEF and the second stage 302 represents all of the stages after the GEF within the EDFA 300.

If the GEF is divided into two or more separate GEF's which are placed in multiple locations within the EDFA, according to the present invention, only one GEF need be measured while all others may be chosen through other considerations, i.e., power, noise, ease of fabrication, etc. The one GEF that is measured may be advantageously determined according to the present invention.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The invention claimed is:

1. A method of designing a gain equalization filter (GEF) positioned at an output end of an optical fiber amplifier, said method comprising the steps of:

applying, at an input end of the optical fiber amplifier, a predetermined input signal having a desired power spectrum;

measuring, an output power spectrum for a signal output from the output end of the optical fiber amplifier; and determining, a difference between the measured output power spectrum for the output signal and the desired power spectrum of the predetermined input signal wherein said difference defines a characteristic shape of the GEF.

2. The method according to claim 1 wherein said optical fiber amplifier is an erbium-doped fiber amplifier (EDFA).

3. The method according to claim 1 wherein said GEF further comprises one or more passive components, positioned in an optical path within the GEF.

4. The method according to claim 3 wherein said passive components are optical isolators.

5. The method according to claim 3 wherein said passive components are splitters.

6. The method according to claim 1 wherein said optical fiber amplifier comprises a plurality of stages.

7. A method for designing a gain equalization filter (GEF) positioned at an input end of an optical fiber amplifier, said method comprising the steps of:

applying to an input of the GEF, a first signal having a known power spectrum;

applying, at an output of the GEF, a second input signal having a required power spectrum such that a signal having a desired power spectrum is output from the fiber amplifier; and determining, a difference between the required power spectrum of the second input signal and the power spectrum of the first input signal wherein the difference between the two signals defines a characteristic shape of the GEF.

8. The method according to claim 7 wherein said optical fiber amplifier is an erbium-doped fiber amplifier (EDFA).

9. The method according to claim 8 wherein said GEF further comprises one or more passive components positioned in an optical path within the GEF.

10. The method according to claim 8 wherein said optical fiber amplifier comprises a plurality of stages.

11. The method according to claim 9 wherein said passive components are optical isolators.

12. The method according to claim 9 wherein said passive components are optical splitters.

13. A method of designing a gain equalization filter (GEF) for an optical fiber amplifier having a plurality of stages, wherein said GEF is positioned within said optical fiber amplifier in an optical path between two of the stages, said method comprising the steps of:

applying, at an input end of an upstream stage, an input signal having a desired characteristic power spectrum;

measuring, at an output of said upstream stage, an output power spectrum for a signal output;

determining, an input power spectrum for a signal input to a downstream stage such that an output signal having a desirable power spectrum is produced;

determining, a difference between the input power spectrum of the downstream stage and the output power spectrum for the upstream stage such that the determined difference defines a characteristic shape of the GEF when the GEF is positioned in an optical path between said upstream stage and said downstream stage.

14. The method according to claim 13 wherein said optical fiber amplifier is an erbium-doped fiber amplifier (EDFA).

15. The method according to claim 13 wherein said GEF further comprises one or more passive components placed in an optical path within the GEF.

16. The method according to claim 15 wherein said passive components are optical isolators.

17. The method according to claim 15 wherein said passive components are optical splitters.

* * * * *